US011967338B2

(12) United States Patent
    Kr

(10) Patent No.: US 11,967,338 B2
(45) Date of Patent: Apr. 23, 2024

(54) SYSTEMS AND METHODS FOR A COMPUTERIZED INTERACTIVE VOICE COMPANION

(71) Applicant: DISH NETWORK TECHNOLOGIES INDIA PRIVATE LIMITED, Bengaluru (IN)

(72) Inventor: Rangu Kr, Bangalore (IN)

(73) Assignee: DISH NETWORK TECHNOLOGIES INDIA PRIVATE LIMITED (IN)

( * ) Notice: Subject to any disclaimer, the term of this patent is extended or adjusted under 35 U.S.C. 154(b) by 132 days.

(21) Appl. No.: 17/081,824

(22) Filed: Oct. 27, 2020

(65) Prior Publication Data
    US 2022/0130413 A1    Apr. 28, 2022

(51) Int. Cl.
    *G10L 25/63*    (2013.01)
    *G10L 15/22*    (2006.01)
    *G10L 25/66*    (2013.01)

(52) U.S. Cl.
    CPC ............. *G10L 25/63* (2013.01); *G10L 15/22* (2013.01); *G10L 25/66* (2013.01); *G10L 2015/223* (2013.01)

(58) Field of Classification Search
    CPC ... G10L 2015/223; G10L 25/66; G10L 15/22; G10L 25/63
    See application file for complete search history.

(56) References Cited

U.S. PATENT DOCUMENTS

| | | | |
|---|---|---|---|
| 6,598,020 B1 * | 7/2003 | Kleindienst | G10L 13/08 704/270.1 |
| 8,311,605 B2 | 11/2012 | Wilder-Smith et al. | |
| 8,396,530 B1 | 3/2013 | Wilder-Smith et al. | |
| 8,774,893 B2 | 7/2014 | Wilder-Smith et al. | |
| 8,965,479 B2 | 2/2015 | Wilder-Smith et al. | |

(Continued)

FOREIGN PATENT DOCUMENTS

WO    WO-0150387 A1 *    7/2001    ............. G06Q 30/02

OTHER PUBLICATIONS

"How it Works", Web page <https://www.affectiva.com/how/how-it-works>, retrieved on Oct. 27, 2020, 3 pages.

(Continued)

*Primary Examiner* — Brian L Albertalli
(74) *Attorney, Agent, or Firm* — Kipman Tyler Werking; VLP Law Group LLP

(57) ABSTRACT

Systems and methods for a computerized interactive voice companion include functionality that receives audio of a user's voice as the user is speaking; detects a tone and/or other relevant aspects associated with the content of the user's voice based on the audio of the user's voice as the user is speaking and determines, as the user is speaking, a response to the user speaking based on the detected tone and/or other relevant aspects associated with the content of the user's voice of the user's voice. The computerized interactive voice companion system, then orally or visually provides the response to the user automatically in real-time as a reply to the user speaking. The system may then (Continued)

continue the conversation based on continuing to detect the mood of the user as they speak and basing responses on this, as well as other recent user behavior detected to be relevant to the conversation.

17 Claims, 9 Drawing Sheets

(56) References Cited

U.S. PATENT DOCUMENTS

| | | | |
|---|---|---|---|
| 9,106,958 B2 | 8/2015 | El Kaliouby et al. | |
| 9,204,836 B2 | 12/2015 | Bender et al. | |
| 9,247,903 B2 | 2/2016 | Bender et al. | |
| 9,503,786 B2 | 11/2016 | Kaliouby et al. | |
| 10,276,188 B2* | 4/2019 | Feast | G06F 17/00 |
| 11,191,466 B1* | 12/2021 | Heneghan | A61B 5/02055 |
| 11,410,682 B2* | 8/2022 | Eleftheriou | G06F 11/327 |
| 2015/0257681 A1* | 9/2015 | Shuster | A61B 5/18 600/595 |
| 2015/0371663 A1* | 12/2015 | Gustafson | G10L 25/51 704/270.1 |
| 2016/0019915 A1* | 1/2016 | Khan | G10L 19/018 704/239 |
| 2018/0254041 A1* | 9/2018 | Harper | G10L 25/51 |
| 2018/0331839 A1* | 11/2018 | Gao | G06Q 10/107 |
| 2019/0213465 A1* | 7/2019 | Avrahami | G06F 3/167 |
| 2021/0366045 A1* | 11/2021 | Young | G06Q 40/06 |
| 2022/0036554 A1* | 2/2022 | Greenwood | G06V 40/20 |
| 2022/0108164 A1* | 4/2022 | Coman | G06N 5/045 |

OTHER PUBLICATIONS

McManus, "Nuance: How to Design Effective Human-Vehicle Interactions from the Consumer Perspective", Web page <https://blog.affectiva.com/nuance-how-to-design-effective-human-vehicle-interactions-from-the-consumer-perspective> published on Apr. 20, 2019, retrieved on Oct. 27, 2020, 5 pages.

"Tap into Emotion Recognition for Radically New Insights, ML-driven emotion recognition solutions that boost your operational efficiency", Web page <https://www.oxagile.com/competence/computer-vision/emotion-recognition/>, retrieved on Oct. 27, 2020, 7 pages.

Zijderveld, "Our Evolution from Emotion AI to Human Perception AI", Web Page <https://blog.affectiva.com/our-evolution-from-emotion-ai-to-human-perception-ai>, published on Apr. 2, 2019, retrieved on Oct. 27, 2020, 3 pages.

* cited by examiner

SYSTEMS AND METHODS FOR A COMPUTERIZED INTERACTIVE VOICE COMPANION

TECHNICAL FIELD

The technical field relates to computerized systems, and particularly to a computerized interactive voice companion.

BRIEF SUMMARY

Current statistics indicate rates of depression in people are increasing at alarming levels. Experts attribute this to a lack of community and companionship, as people are spending more time in front of screens and not in front of other people. Existing voice-enabled systems may provide informational content and automate home appliances, but do not adequately react to a user's emotional state or detect a user's mood and combine that with detecting the user's recent behavior to have a conversation with the user to act as a companion and provide emotional support.

The present disclosure provides a technical solution to the technical problem above and improves the technology of automated voice-enabled systems by providing a computerized interactive voice companion that, in some embodiments, receives audio of a user's voice as the user is speaking; detects a tone of the user's voice based on the audio of the user's voice as the user is speaking and determines, as the user is speaking, a response to the user speaking based on the detected tone of the user's voice. The computerized interactive voice companion system, then orally or visually provides the response to the user automatically in real-time as a reply to the user speaking. The system may then continue the conversation based on continuing to detect the mood of the user as they speak and basing responses on this, as well as other recent user behavior detected to be relevant to the conversation.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

Figure 1:
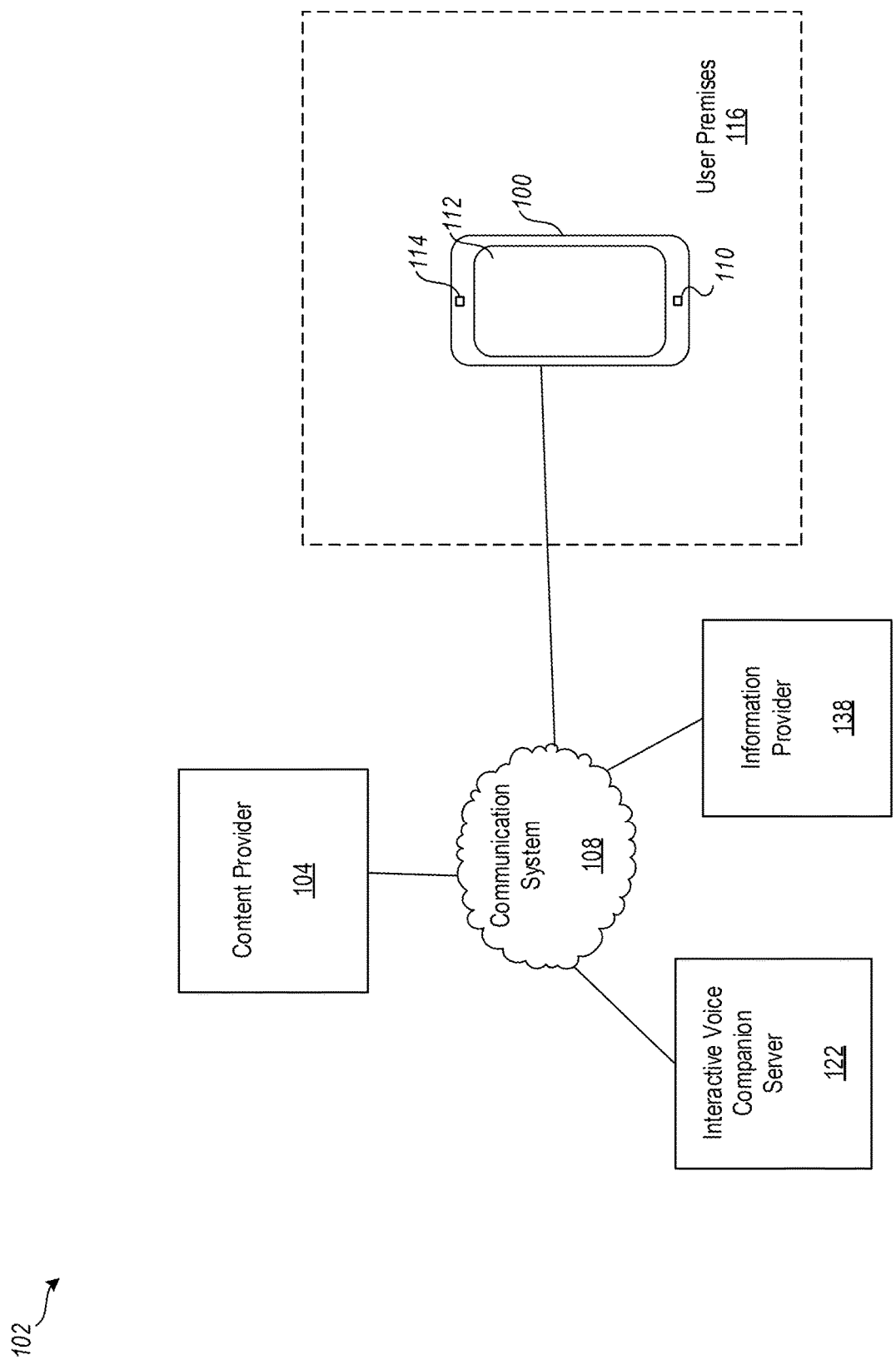
FIG. 1 is an overview block diagram illustrating a technical environment in which embodiments of systems and methods for a computerized interactive voice companion may be implemented.

FIG. 1 is an overview block diagram illustrating a technical environment in which embodiments of systems and methods for a computerized interactive voice companion may be implemented.

Before providing additional details regarding the operation and constitution of systems and methods for a computerized interactive voice companion, the example technical environment 102, within which such a system may operate, will briefly be described.

In the technical environment 102, the interactive voice companion server 122 interconnects to one or more other devices, such a user device 100, an information provider 138 and a content provider 104, via communication system 108. For example, the devices may communicate using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The interactive voice companion server 122 may receive a plurality of data by way of various sources, or may only receive data via a particular channel or source described in greater detail below. In some embodiments, based upon selection by a user, the interactive voice companion server 122 processes and communicates selected data to the user device 100. Also, in some embodiments, the user device 100 may also be an interactive voice companion server or have an interactive voice companion server integrated within it.

Examples of a user device 100 may include, but are not limited to, devices such as, or any combination of: a "smart speaker," "mobile device," "smartphone," "tablet computer," "digital assistant," "Internet of Things (IoT) device," "television converter," "receiver," "set-top box," "receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "MP3 Player," "handheld computer," "gaming console" and/or "television tuner," etc. Accordingly, the user device 100 may be any suitable device or electronic equipment that is operable to receive data via a connection to communication system 108 and communicate that data to a user. Further, the user device 100 may itself include user interface devices, such as buttons or switches. In some example embodiments, the user device 100 may be configured to receive and decrypt content and/or software or firmware updates and other access control technologies and architectures as part of or in addition to implementing the processes of a computerized interactive voice companion, which will be described in further detail below.

The user device 100 may employ a microphone 110, a touchscreen display 112, one or more speakers 114, and/or other output devices (not shown) to communicate video and/or audio content to a user. In some embodiments, the user device may include a video camera (not shown) to capture video of the user and stream the video in real time. The user device 100 employs the microphone 110, the touchscreen display 112 and, in some embodiments, a keyboard and/or other input devices, e.g., a video camera, (not shown) to communicate commands or other input to the user device 100 and/or interactive voice companion server 122. In many implementations, one or more user devices 100 reside in or near a user premises 116 and are communicatively coupled, directly or indirectly, to the interactive voice companion server 122. Further, the interactive voice companion server 122 and the user device 100 may be integrated into a single device. Such a single device may have the functionality described herein of the interactive voice companion server 122 and the user device 100, or may even have additional functionality.

The user device 100 may include a microphone 110 that may be voice or audio activated in order to receive commands or other voice input. In some embodiments, such voice input may be communicated to and used by the interactive voice companion server 122 and/or user device 100 and cause such devices to perform the actions described herein and other actions. For example, such voice input may be processed by the interactive voice companion server 122 and/or user device 100 and cause the interactive voice companion server 122 and/or user device 100 to detect a tone of the user's voice based on the audio of the user's voice as the user is speaking and then determine, as the user is speaking, a response to the user speaking based on the detected tone of the user's voice. The user device 100 then outputs the response via the speaker 114 and/or display 112. In some embodiments, the user device 100 may be a voice-enabled device and the same microphone 110 may also be used to receive voice commands from the user and transmit corresponding commands to the interactive voice companion server 122 to control the interactive voice companion server 122 and/or other peripheral devices.

In various embodiments, the information provider 138 may provide supplemental information to the interactive voice companion server 122 and/or user device 100 that is used by the interactive voice companion server 122 and/or user device 100 to detect a tone of the user's voice and determine a response to the user. For example, such information may include data regarding the user including, but not limited to: location history, online activity, web browsing history, search terms used by the user, electronic communications, biometric sensor information, calendar items, clock items, and purchases of the user. Such information may be the result of the information provider 138, interactive voice companion server 122 and/or user device 100 monitoring such activity online via a global positioning system (GPS) and other systems (e.g., biometric sensors, wearable devices, trackers, web servers, web browsers point-of sale systems, payments systems, video and audio monitoring systems, etc.) that may be interconnected with or included as part of the information provider 138, interactive voice companion server 122 and/or user device 100, such as via communication system 108 or other short-range wireless systems (e.g., Bluetooth®). Such information may be used by the interactive voice companion server 122 and/or user device 100 to provide context of the user's situation when determining how to respond to a user in order to provide emotional support and companionship to the user.

In some embodiments, in order to provide selected and customized entertainment to the user based on a detected tone of voice or detected mood of the user, content provider 104 provides program content, such as streaming or television content, to the interactive voice companion server 122 and/or user device 100. In some embodiments, such content may be provided via program distributors which include, but are not limited to, satellite and cable television service providers. Example content providers include television stations which provide local or national television data and special content providers which provide premium based data, streaming services, pay-per-view data and on-demand data. For example, program content may be communicated to a program distributor from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In some embodiments, the user device 100 may be a set-top box that is provided by the content provider 104, cable provider, satellite provider, or other program distributor to which the user may subscribe to receive such television services and that also receives data through other channels using a terrestrial, satellite signal, and/or cable television format. The user device 100 is in communication with the interactive voice companion server 122, which may be provided by the content provider 104 or program distributor, such as a cable provider or satellite provider. However, in some instances, such a user device 100 may be a device other than that which is provided by the content provider 104 or program distributor. For example, these may include various user devices such as a smart speaker, tablet device, game machine, smartphone, mobile device or other computing device or media player or communications device not provided by or controlled by the content provider 104, cable provider, satellite provider, or other program distributor to which the user subscribes for the television services.

In addition, content provider 104 and/or information provider 138 may provide various forms of content and/or services to various devices residing in the user premises 116. For example, content provider 104 may provide information to the user device 100 or interactive voice companion server 122 regarding user or user accounts and program viewing behavior associated with the content provider 104; corresponding user preferences and settings; and/or additional processing of the audio of the user's voice to enable the interactive voice companion server 122 and/or user device 100 to generate responses to the user and have a conversation with the user. Such services may include artificial intelligence and machine learning functionality to improve the responses and conversation for a particular user based on a feedback loop from the interactive voice companion server 122 and/or user device 100 regarding the accuracy and helpfulness of previous responses to, and conversations with, the user.

The above description of the environment 102, the user premises 116, and the various devices therein, is intended as a broad, non-limiting overview of an example environment in which various embodiments of a computerized interactive voice companion may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different supplemental content servers, content providers, program distributors, information providers and other servers that operate in a corresponding manner as the interactive voice companion server 122, information provider 138, content provider 104 and/or user device 100 as described herein. Each of interactive voice companion server 122, information provider 138, content provider 104 and user device 100 may represent one or more of such systems in various embodiments.

Example embodiments described herein provide applications, tools, data structures and other support to implement a computerized interactive voice companion. Other embodiments of the described techniques may be used for other purposes, including providing emotional support and guidance for groups of people, based on voice recognition identifying individuals within the group and customizing responses based on the particular user that is identified by their voice. Also, a computerized interactive voice companion may be implemented by various other devices, such as audio and DVD players, digital recorders, computers, peripherals, televisions, mobile devices, active speakers, headphones, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
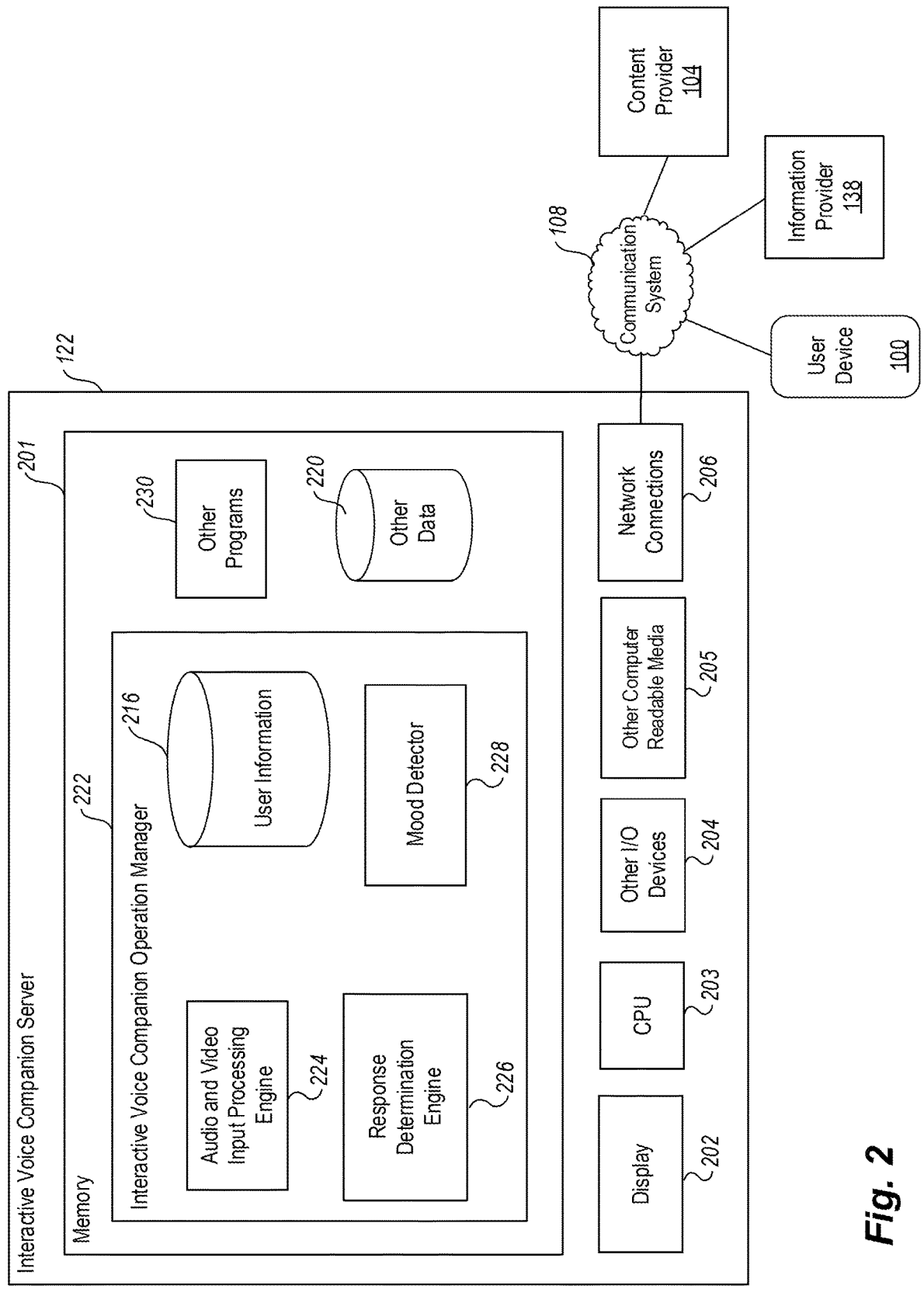
FIG. 2 is a block diagram illustrating elements of an example interactive voice companion server used in systems and methods for a computerized interactive voice companion, according to an example embodiment.

FIG. 2 is a block diagram illustrating elements of an example interactive voice companion server 122 used in systems and methods for a computerized interactive voice companion, according to an example embodiment.

In one embodiment, the interactive voice companion server 122 is a computing device that receives input from, and provides output to, the user device 100. For example, the interactive voice companion server 122 may be configured to receive, from user device 100, audio of a user's voice as the user is speaking, detect a tone of the user's voice based on the audio of the user's voice as the user is speaking and determine, as the user is speaking, a response to the user speaking based on the detected tone of the user's voice. The interactive voice companion server 122 may then communicate the response over communication system 108 to the user device 100, such that the user device 100 may output the response as a recorded or synthesized human voice to the user. These operations occur in real time and quickly enough as the user is speaking such that the responses communicated from the interactive voice companion server 122 to the user device 100 appear to be from a person in the room with the user having a conversation in real time with the user. In some embodiments, some or all of the operations of the interactive voice companion server 122 are instead performed by the user device 100, which further improves the response time of the computerized interactive voice companion disclosed herein.

Note that one or more computing systems/devices may be used to operate the interactive voice companion server 122 (including special propose devices); store information regarding the interactive voice companion server 122, store metadata, decrypt and encrypt received data; pair with various user devices on a home LAN and/or over the Internet; establish connection between the interactive voice companion server 122 and various user devices; communicate data, including data, between the interactive voice companion server 122 and various user devices via the home LAN and/or Internet; and communicate with the content provider 104 and information provider 138. In addition, in some embodiments, the interactive voice companion server 122 may comprise one or more distinct computing systems/devices and may span distributed locations. Furthermore, each block shown may represent one or more such blocks as appropriate to a specific embodiment or may be combined with other blocks. Also, the interactive voice companion server operation manager 222 may be implemented in software, hardware, firmware, or in some combination to achieve the capabilities described herein.

In the embodiment shown, interactive voice companion server 122 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206.

The interactive voice companion server operation manager 222 is shown residing in memory 201. In other embodiments, some portion of the contents and some, or all, of the components of the interactive voice companion server operation manager 222 may be stored on and/or transmitted over the other computer-readable media 205. The components of the interactive voice companion server 122 and operation manager 222 preferably execute on one or more CPUs 203 and facilitate the receiving audio of a user's voice as the user is speaking; detecting a tone of the user's voice based on the audio of the user's voice as the user is speaking; determining, as the user is speaking, a response to the user speaking based on the detected tone of the user's voice; and communicating the response to the user automatically in real-time as a reply to the user speaking.

In one embodiment, the audio and video input processing engine 224 is configured to receive audio of a user's voice as the user is speaking and detect a tone of the user's voice based on the audio of the user's voice as the user is speaking. For example, the audio and video input processing engine 224 may electronically analyze acoustic characteristics of the audio to not only identify a particular user, but also detect a tone of the user's voice by detecting, processing and analyzing various frequencies from the input signal representing the user's voice and comparing these with baseline signals representing not only the user's own voice and other human voices as well. The audio and video input processing engine 224 may also remove noise, such as from other ambient sound, from the input signal representing the user's voice and convert the audio to text. The audio and video input processing engine 224 may also receive video of the user captured by the user device 100 and interpret facial expressions, body language and/or sign language to determine or facilitate determining the mood or emotional state of the user as well as content of what the user is communicating.

The mood detector 228 may (e.g., based on the detected tone of the user's voice) determine the mood of the user based on the output of the audio and video input processing engine 224. Determining the mood of the user may be based on a number of different factors including, but not limited to, one or more of: the content of the user's speech; detected tone of the user's voice; facial expression and body language captured on video of the user (including sign language); tracked user behavior (e.g., including tracked location, online activity, electronic communications, biometric sensor information, calendar items, clock items, and purchases of the user); a detected change in mood or user behavior; input from contacts or friends of the user; and detected interactions of the user with contacts or friends of the user (e.g., on online social media accounts and platforms); and detected user personality type. In some embodiments, such information may be stored in and accessed from the user information database 216. User preferences (e.g., in music, art and other media, personality types, friends, systems settings, etc.) may also be stored in and accessed from the user information database 216.

In one embodiment, the audio and video input processing engine 224 and/or mood detector 228 may perform natural language processing (NLP) on the audio that has been converted to text as the user is speaking, such as when speaking into user device 100. NLP is a branch of artificial intelligence that helps computers understand, interpret and manipulate human language. NLP may use representation learning and deep neural network-style machine learning methods to recognize concepts, topics, facts, and statements made in the verbal content of the audio of the user's voice. Such techniques can perform many such natural language tasks, for example in language modeling, parsing, and many others. Some techniques include the use of word embeddings to capture semantic properties of words, and an increase in end-to-end learning of a higher-level task (e.g., question answering) instead of relying on a pipeline of separate intermediate tasks (e.g., part-of-speech tagging and dependency parsing).

Deep neural network-based approaches may be used instead of or in addition to distinct statistical natural language processing. With neural machine translation (NMT), deep learning-based approaches to machine translation directly learn sequence-to-sequence transformations, obviating the need for intermediate steps such as word alignment and language modeling that are used in statistical machine translation (SMT). For example, the audio and video input processing engine 224 and/or mood detector 228 may perform NLP on the text associated with the audio of the user's voice to detect an emotional state (e.g., mood) or of the user communicated by the text. For example, the NLP of the text may recognize that the text, "It's been years since I took a vacation" is a grammatical statement that may serve as a basis for, or may be paired to, a corresponding mood or emotional state of being exasperated or burnt out. The association may also be based on the tone of the user's voice when making the statement. For example, if the frequencies detected in the user's voice when making the statement indicate a happy mood and the user has on their calendar a vacation coming up the next day, then the association of that statement in that particular circumstance may be paired with a mood of anticipation (e.g., of an upcoming vacation that is about to happen) rather than exasperation.

The audio and video input processing engine 224 and/or mood detector 228 may also detect the mood or emotional state of the user based on facial expressions, sign language, and/or body language captured on video of the user (e.g., via a camera of the user device 100). The audio and video input processing engine 224 and/or mood detector 228 may then store such associations and/or pairings in the user information database 216. Various emotional intelligence systems may be used by the mood detector to detect or determine the emotional state or mood of the user based on audio and/or video input data, including, for example, those available from companies such as Oxagile at oxagile.com and Affectiva at affectiva.com The audio and video input processing engine 224 and/or mood detector 228 may communicate such associations and pairings, as such associations are made, to the response determination engine 226 for immediate further processing in real time.

The response determination engine 226 then generates a response based on the output from the mood detector 228, as the user is speaking, that resulted from the processing of the audio of the user's voice and/or video of the user. In some embodiments, the response determination engine 226 may generate responses that are based on one or more of the moods or emotional states of the user detected by mood detector 224. For example, the response determination engine 226 may select, generate and/or communicate a response to be output by the user device 100 each time a statement or phrase is spoken by the user into the user device 100. In some embodiments, the response may be a question to the user based on the detected mood of the user. For example, if the mood detector detects the user is sad, then the response determination engine 226 may communicate a question to the user asking why the user is sad. The interactive voice companion server 122 may then receive a voice response from the user to the question to the user inquiring why the user is sad. The interactive voice companion server operation manager 222 may then cause the interactive voice companion server 122 to have, via the user device 100, an oral or visual conversation in real-time with the user based on a response to the question to the user inquiring why the user is sad. The responses determined by the response determination engine 226 during the conversation may change and are dynamically selected during the conversation based on changes in mood of the user detected by the mood detector 228 during the conversation with the user.

In some embodiments, the response determination engine 226 may cause a content (e.g., music, video, pictures, other media, sign language, etc.) to be presented that is part of or is relevant to the generated response. For example, the response determination engine 226 may generate various types of supplemental content based on the mood of the user detected by the mood detector 228. Such supplemental content may include, but is not limited to: suggestions; guidance; questions; fun facts; trivia; and additional information about topics, subjects, objects, people or places recognized in or related to the received audio of the user's voice and the detected mood of the user.

Other code or programs 230 (e.g., further audio/video processing modules, user preference engine, a Web server, and the like), and potentially other data repositories, such as data repository 220 for storing other data (user profiles, preferences and configuration data, etc.), may also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the interactive voice companion server 122 and operation manager 222 include an application program interface ("API") that provides programmatic access to one or more functions of the interactive voice companion server 122 and operation manager 222. For example, such an API may provide a programmatic interface to one or more functions of the interactive voice companion server operation manager 222 that may be invoked by one of the other programs 230, the user device 100, content provider 104 or information provider 138 or some other module. In this manner, the API may facilitate the development of third-party software, such as various different on-demand service applications, user interfaces, plug-ins, adapters (e.g., for integrating functions of the interactive voice companion server operation manager 222 and information provider 138 into the user device 100, another mobile device and/or desktop applications), and the like to facilitate a computerized interactive voice companion using the interactive voice companion server 122.

In an example embodiment, components/modules of the interactive voice companion server 122 and operation manager 222 are implemented using various data techniques. For example, the interactive voice companion server operation manager 222 may be implemented as a "native" executable running on the CPU 203, along with one or more static or dynamic libraries. In other embodiments, the interactive voice companion server 122 and operation manager 222 may be implemented as instructions processed by a virtual machine that executes as one of the other programs 230. In general, a range of data languages known in the art may be employed for implementing such example embodiments, including representative implementations of various data language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the interactive voice companion server 122 to perform the functions of the interactive voice companion server operation manager 222 described herein. The embodiments described above may also use well-known or other synchronous or asynchronous client-server computing techniques. However, the various components may be implemented using more monolithic data techniques as well, for example, as an executable running on a single CPU computer system, or alternatively decomposed using a variety of structuring techniques known in the art, including but not limited to, multidata, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by an interactive voice companion server operation manager 222 implementation. Also, other functions could be implemented and/or performed by each component/module, and in different orders, and by different components/modules, yet still achieve the functions of the interactive voice companion server 122 and operation manager 222.

In addition, data interfaces to the data stored as part of the interactive voice companion server 122 and operation manager 222, can be available by mechanisms such as through C, C++, C#, and Java APIs; libraries for accessing files, databases, or other data repositories; scripting languages such as XML; or Web servers, FTP servers, NFS file servers, or other types of servers providing access to stored data. The user information database 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the interactive voice companion server operation manager 222.

Furthermore, in some embodiments, some or all of the components of the interactive voice companion server 122 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

FIGS. 3A through 3D are diagrams of an example user device 100 illustrating respective example conversational output of a computerized interactive voice companion, according to an example embodiment.

Figure 3A:
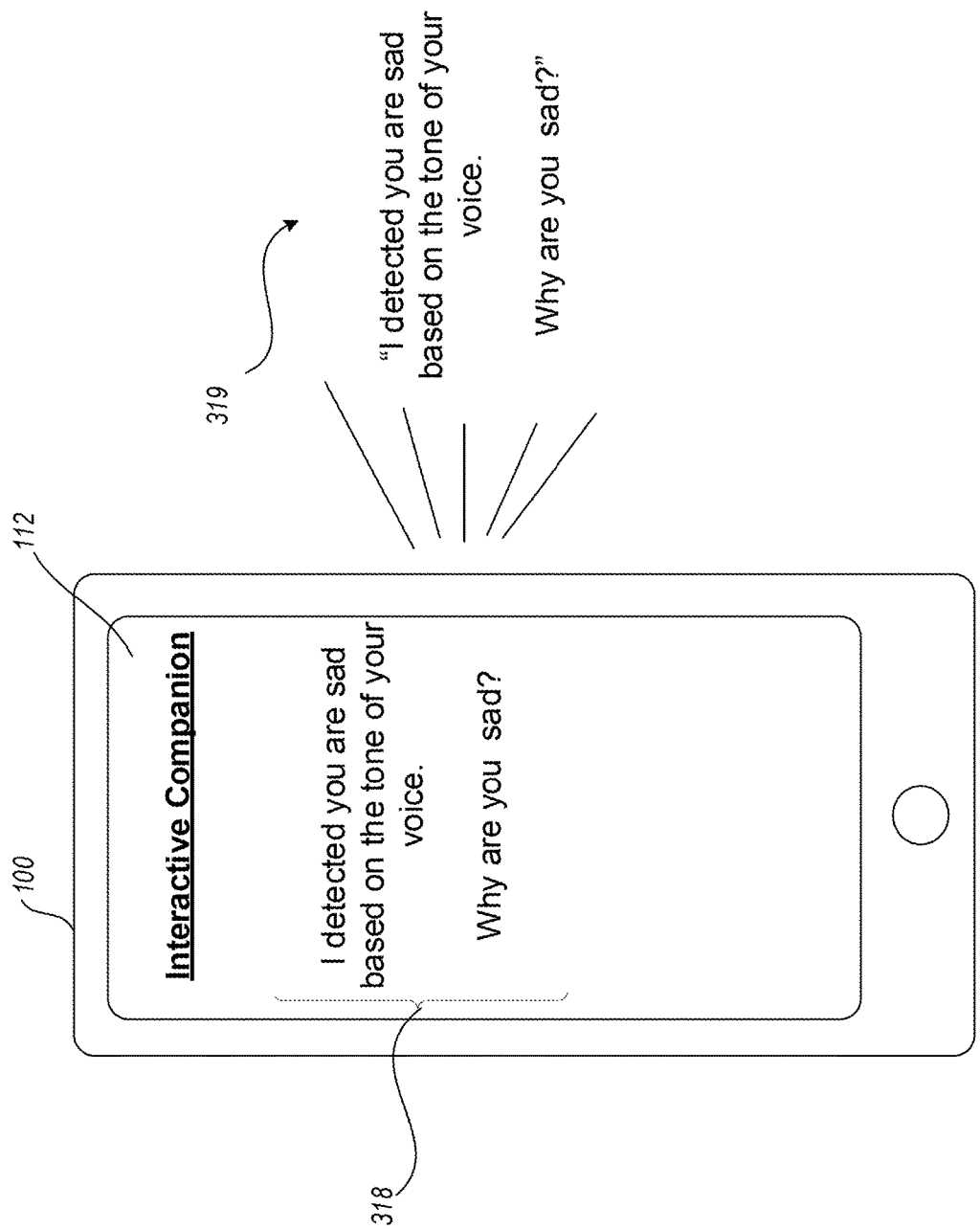
FIGS. 3A through 3D are diagrams of an example user device illustrating respective example conversational output of a computerized interactive voice companion, according to an example embodiment.

In the example shown in FIG. 3A, the interactive voice companion server 122 and/or user device 100 has detected, e.g., by analysis of the tone and content of the users voice spoken into the user device 100, that the user is in a sad mood or similar emotional state. In response, the user device 100 has output both a written response 318 on the user device screen 112 and an audio response 319 via speaker (not shown) of the user device 100 based on the detected mood of the user.

In the present example, the interactive voice companion server 122 and/or user device 100 has detected the user is in a sad mood and has thus provided both a written response 318 on the user device screen 112 and an audio response 319 that says "I detected you are sad based on the tone of your voice. Why are you sad?" Depending on the user's reply to the question (and potentially also further questions in the conversation), the interactive voice companion server 122 and/or user device 100 may carry on the conversation with the user providing encouragement, guidance and suggestions to the user to provide a virtual companion to the user. In some embodiments, the response 319 may also or instead be played as a sign language video for those with hearing impairments.

The interactive voice companion server 122 and/or user device 100 may also generate, store and/or access audio files that include pre-recorded audio prompts, responses or other messages in various applicable voices and tones that may be played by the interactive voice companion server 122 and/or user device 100 to interact with the user in conversation based on the detected mood and other factors as discussed herein. Such information may further include logging information, such as recordings of voice audio of the particular user received by voice companion server 122 and/or user device 100. Such data may also be used to train an AI model of the voice companion server 122 and/or user device 100 to more accurately detect the mood and generate helpful responses for the particular user in future conversations with the user.

Figure 3B:
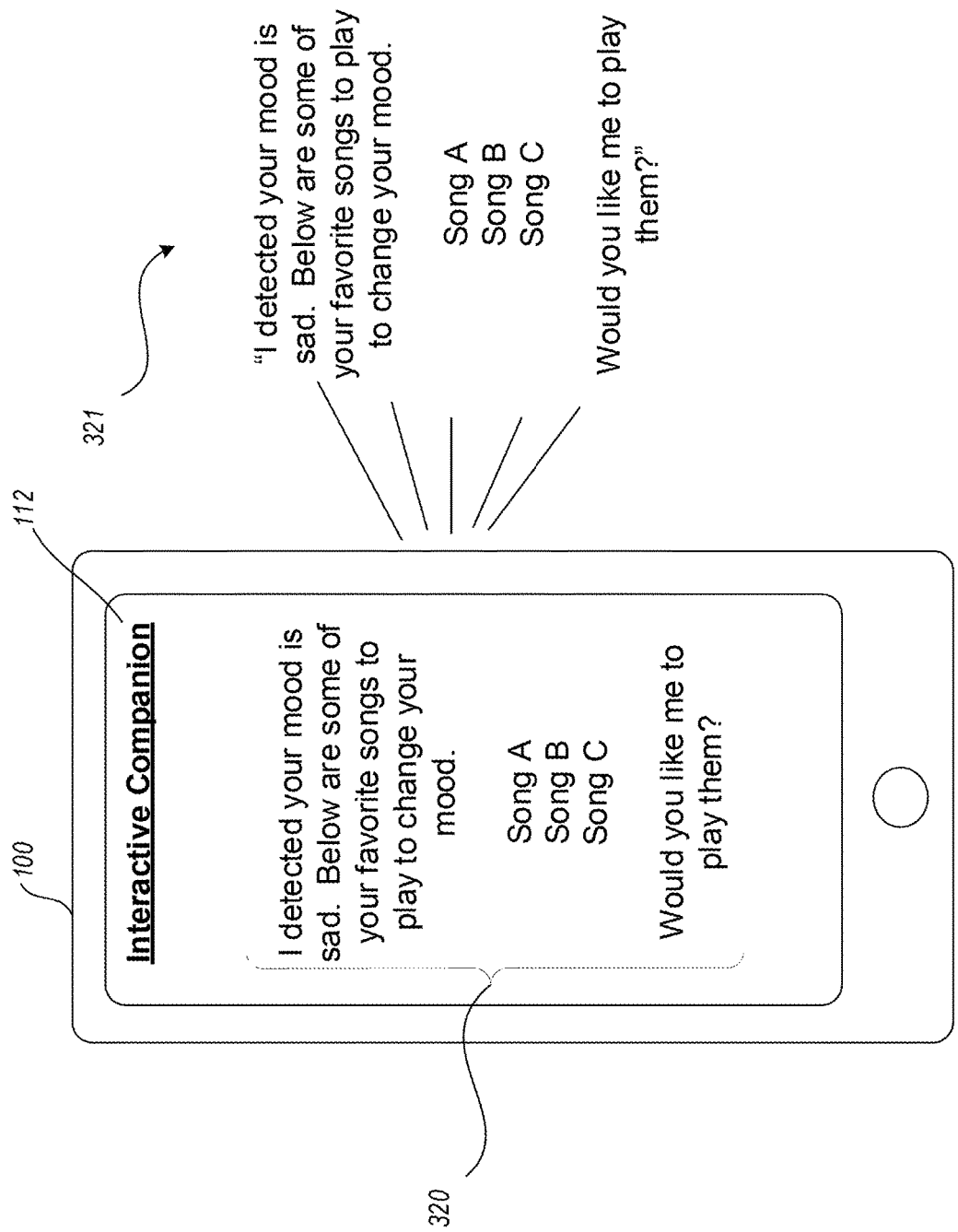

As another example, in FIG. 3B, the interactive voice companion server 122 and/or user device 100 has detected, e.g., by analysis of the tone and content of the users voice spoken into the user device 100, that the user is in a sad mood. In response, the user device 100 has output both a written response 320 on the user device screen 112 and an audio response 321 via a speaker (not shown) of the user device 100 based on the detected mood of the user. In the present example, the interactive voice companion server 122 and/or user device 100 has detected the user is in a sad mood and has thus provided both the written response 320 on the user device screen 112 and the audio response 321 that says "I detected your mood is sad. Below are some of your favorite songs to play to change your mood. Song A Song B Song C". Would you like me to play them?". For example, the interactive voice companion server 122 and/or user device 100 may have tracked the user's playing of various music on the user device 100 and determined that those particular songs (or songs similar to those songs) were preferred by the user based on how frequently they or similar songs were played, and that they are also upbeat songs that may tend to improve one's mood. The user may then respond by saying "yes" and those songs are then, in response, played by the interactive voice companion server 122 and/or user device 100 for the user.

Figure 3C:
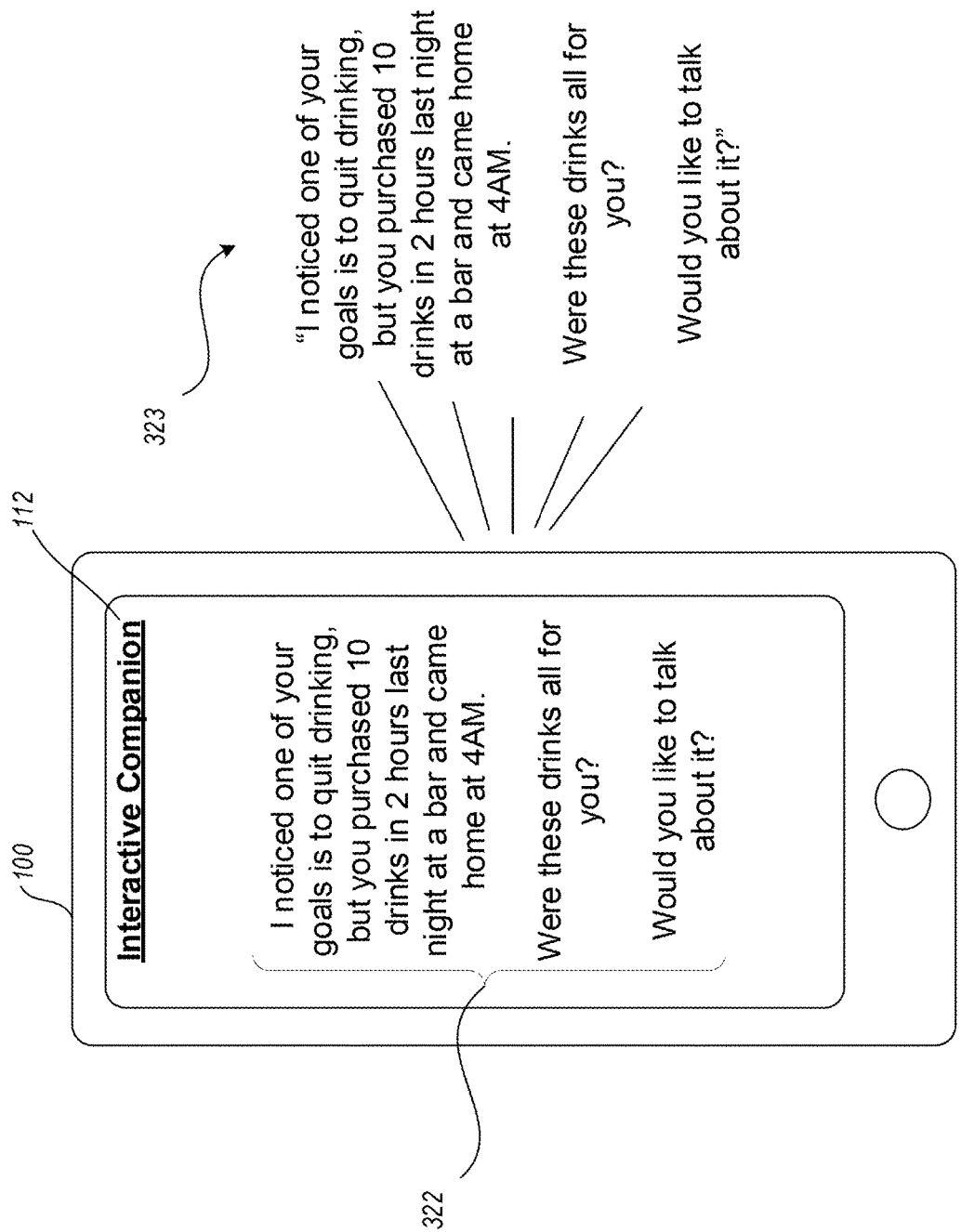

As yet another example, in FIG. 3C, the interactive voice companion server 122 and/or user device 100 has detected, e.g., by analysis of the user's goals (e.g., provided by user input) and the user's tracked behavior, that the user is behaving in a manner that is impeding reaching those goals and may need help. In response, the user device 100 has output both a written response 322 on the user device screen 112 and an audio response 323 via a speaker (not shown) of the user device 100 based on the detected behavior. In the present example, the interactive voice companion server 122 and/or user device 100 has detected, such as via payment system and GPS tracking, that the user purchased 10 drinks in 2 hours while at a bar the previous night and did not come home until 4 AM. Since the interactive voice companion server 122 and/or user device 100 was previously informed by the user that one of the user's goals was to quit drinking, the interactive voice companion server 122 and/or user device 100 100 has thus provided both the written response 322 on the user device screen 112 and the audio response 323 that says "I noticed one of your goals is to quit drinking, but you purchased 10 drinks in 2 hours last night at a bar and came home at 4 AM. Were these drinks all for you? Would you like to talk about it?". Depending on the user's reply to the question (and potentially also further questions in the conversation), the interactive voice companion server 122 and/or user device 100 may carry on the conversation with the user providing encouragement, guidance and suggestions to the user to provide a virtual companion to the user and helpful information on quitting drinking and other alternative activities.

Figure 3D:
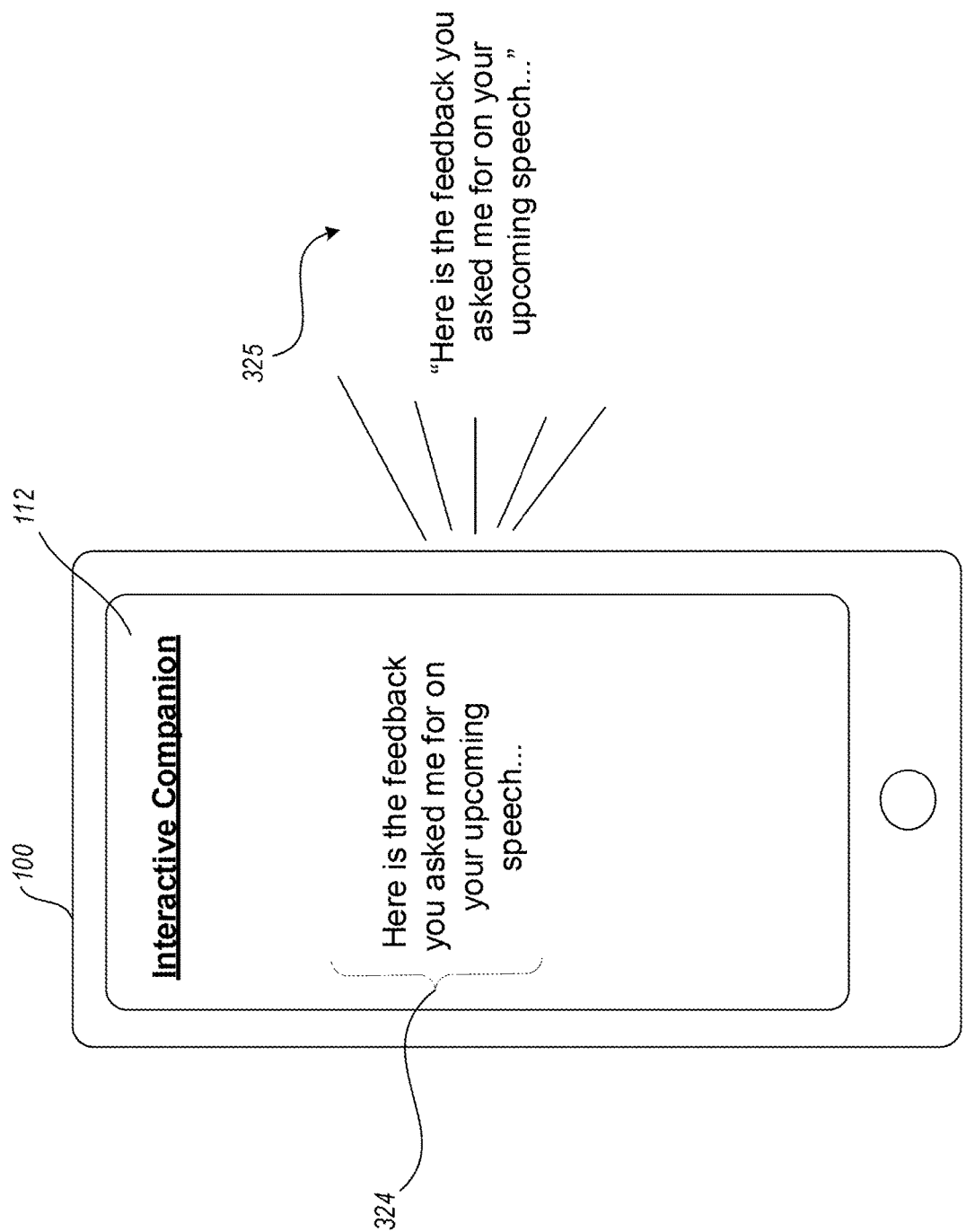

As an additional example, in FIG. 3D, the interactive voice companion server 122 and/or user device 100 has been asked by the user for feedback on an upcoming speech the user is giving for the user's work. For example, the user may have performed the speech such that the user device 100 received audio of the user's voice containing the speech. In response, the user device 100 has processed, analyzed and reviewed the audio for content, clarity and emotional aspects detected in the user's voice. In response, the user device 100 outputs both a written response 324 on the user device screen 112 and an audio response 325 via a speaker (not shown) of the user device 100 based on the review, which says "Here is the feedback you asked me for on your upcoming speech . . . " followed by specific guidance and feedback in voice, test and/or video on items such as content, clarity and emotional aspects detected in the user's voice. For example, in some embodiments, the interactive voice companion server 122 and/or user device 100 may fact check various statements made by consulting trusted sources on the Internet and provide suggestions for improvements and/or count the number of "um's" and "uh's" and other distracting noises, words or grammar mistakes to provide suggestions on improvements and/or praise.

Figure 4:
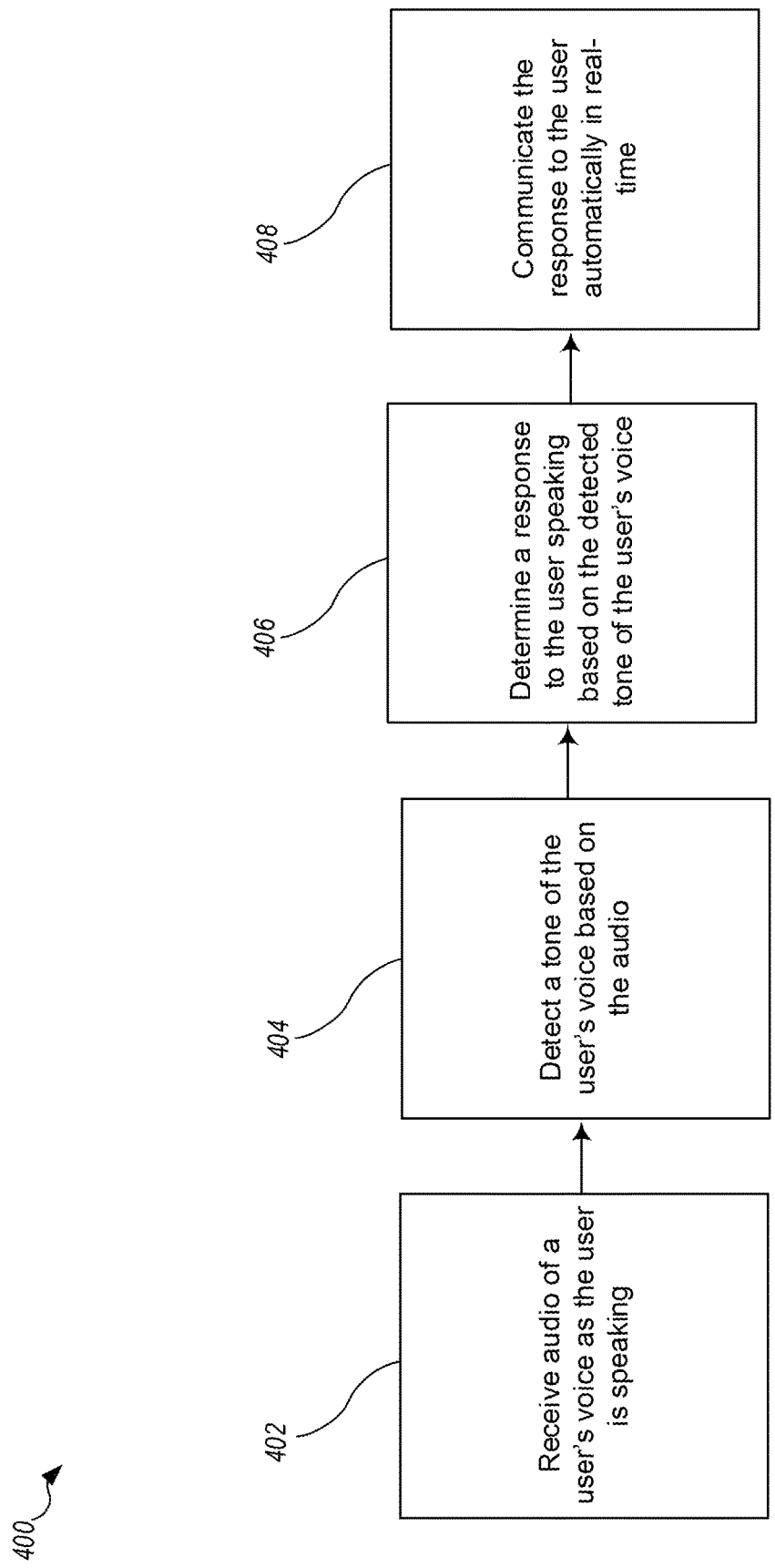
FIG. 4 is a flow diagram of an example method for a computerized interactive voice companion, according to an example embodiment.

FIG. 4 is a flow diagram of an example method 400 for a computerized interactive voice companion, according to an example embodiment.

At 402, the interactive voice companion server 122 and/or user device 100 receives audio of a user's voice as the user is speaking.

At 404, the interactive voice companion server 122 and/or user device 100 detects a tone of the user's voice based on the audio of the user's voice as the user is speaking.

At 406, the interactive voice companion server 122 and/or user device 100 determines, as the user is speaking, a response to the user speaking based on the detected tone of the user's voice. For example, the determining of the response may include determining a mood of the user based on the detected tone of the user's voice; and determining the response to the user speaking based on the determined mood of the user. The determining the mood of the user may include electronically analyzing acoustic characteristics of the audio, determining a particular mood that the acoustic characteristics are associated with, and determining the mood of the user is the particular mood. In one embodiment, determining that the user is in a sad mood is based on the detected tone of the user's voice and, as a result, the response is determined to be a one or more consoling statements to the user based on tracked behavior of the user by the computerized interactive voice companion system and based on the determination that the user is in a sad mood. In some embodiments, the mood detected includes a mood score representing how happy or how sad the user is and the response to the user speaking is based on the mood score.

At 408, the interactive voice companion server 122 and/or user device 100 communicates the response to the user automatically in real-time as a reply to the user speaking. For example, this response may be an audio, video and/or textual response output by a device of the user.

Figure 5:
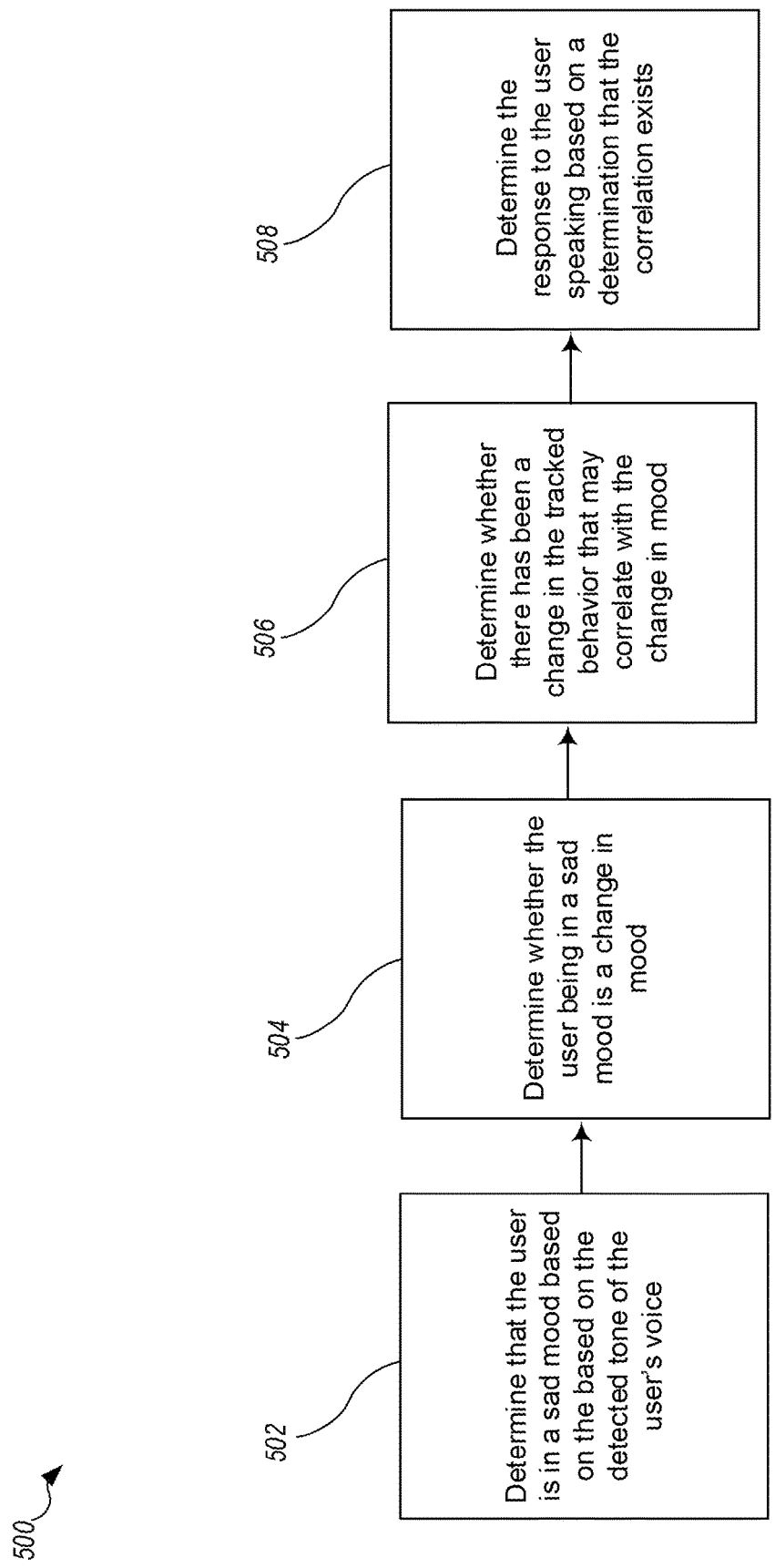
FIG. 5 is a flow diagram of an example method for a computerized interactive voice companion determining a response to the user useful in the method of FIG. 4, according to an example embodiment.

FIG. 5 is a flow diagram of an example method 500 for a computerized interactive voice companion determining a response to the user useful in the method of FIG. 4, according to an example embodiment.

At 502, the interactive voice companion server 122 and/or user device 100 determines that the user is in a sad mood based on the based on the detected tone of the user's voice.

At 504, the interactive voice companion server 122 and/or user device 100 determines whether the user being in a sad mood is a change in mood that has occurred within a most recent threshold amount of time. For example, the user's mood may have changed within the last day or few days, and this is detected by the interactive voice companion server 122 and/or user device 100.

At 506, the interactive voice companion server 122 and/or user device 100 determines whether, within the most recent threshold amount of time, there has been a change in the tracked behavior that may correlate with the change in mood. The tracked behavior may include, but is not limited to, user location, online activity, electronic communications, biometric sensor information, calendar items, clock items, and/or purchases of the user. For example, the interactive voice companion server 122 and/or user device 100 may determine that the detected recent change in mood is due to a death in the family based on a funeral on the user's calendar for the user's grandparent.

At 508, the interactive voice companion server 122 and/or user device 100 determines the response to the user speaking based on a determination that, within the most recent threshold amount of time, there has been a change in the tracked behavior that may correlate with the change in mood. For example, the interactive voice companion server 122 and/or user device 100 may determine the response to be a consoling statement about the death in the family based on a funeral on the user's calendar for the user's grandparent. As another example, the tracked behavior includes the user waking up late based on the clock items and the biometric sensor information and the determined response is to ask questions of the user regarding the user waking up late. As an additional example, the change in the tracked behavior includes the user purchasing over a threshold number of alcoholic drinks within a particular time window and the determined response is to ask questions of the user regarding excessive drinking. As yet another example, the tracked behavior includes tracking music preferences of the user via detecting which songs the user plays, the determined mood of the user is a sad mood, and the determining the response to the user speaking based on the determined mood includes playing a song based on the music preferences of the user to change the determined sad mood into a happy mood of the user.

Figure 6:
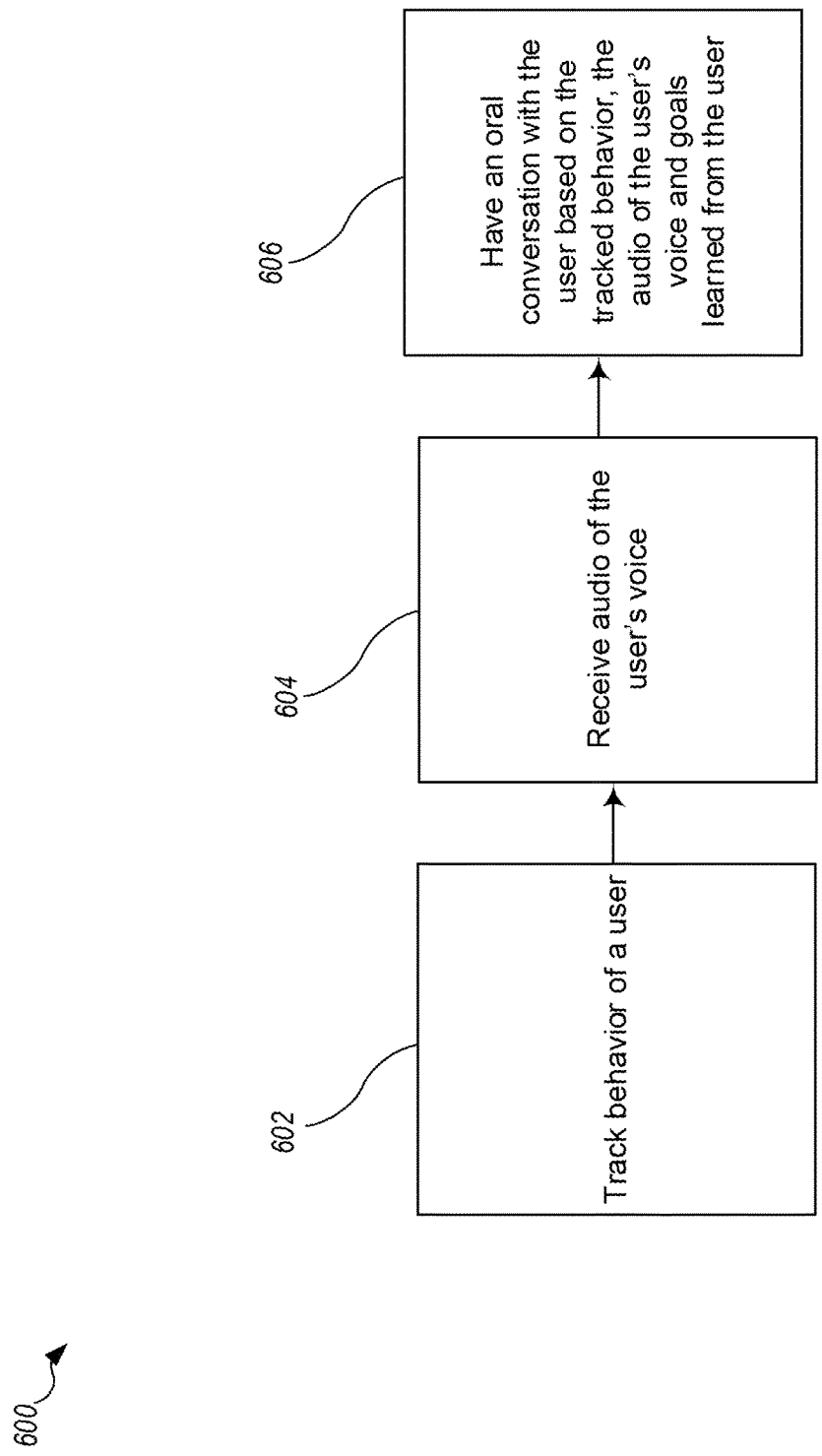
FIG. 6 is a flow diagram of an example method for a computerized interactive voice companion, according to an example embodiment.

FIG. 6 is a flow diagram of an example method 600 for a computerized interactive voice companion, according to an example embodiment.

At 602, the interactive voice companion server 122 and/or user device 100 tracks behavior of the user based on data received from a user device associated with the user.

At 604, the interactive voice companion server 122 and/or user device 100 receives audio of the user's voice as the user is speaking.

At 606, the interactive voice companion server 122 and/or user device 100 has, as the user is speaking, an oral conversation with the user based on the tracked behavior, the audio of the user's voice and goals learned from the user to help the user achieve the goals. In some embodiments, the conversation may instead be based on captured video of the user performing sign language and the conversation is in sign language, with the responses being video of sign language or text output by the user device 100. In various embodiments, the conversation may include, but is not limited to, one or more of: providing suggestions to the user on how to achieve the goals, providing feedback to the user regarding the tracked behavior and suggestions on how to modify user behavior to achieve the goals, and providing suggestions to the user regarding the tracked behavior and information received in audio of the user's voice.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for an interactive voice companion, comprising:
  receiving, by a computerized interactive voice companion system, audio of a user's voice as the user is speaking;
  detecting, by the computerized interactive voice companion system, a tone of the user's voice based on the audio of the user's voice as the user is speaking;
  determining, by the computerized interactive voice companion system, as the user is speaking, a response to the user speaking based on the detected tone of the user's voice, wherein the determining the response includes:
    determining, by the computerized interactive voice companion system, a mood of the user based on the detected tone of the user's voice; and
    determining, by the computerized interactive voice companion system, the response to the user speaking based on the determined mood of the user, wherein the determining the response to the user speaking based on the determined mood of the user includes:
    determining that the user is in a sad mood based on the detected tone of the user's voice; and
    determining the response to be a question to the user inquiring why the user is sad;
  communicating, by the computerized interactive voice companion system, the response to the user automatically in real-time as a reply to the user speaking;
  tracking behavior of the user indicated by data received from a user device associated with the user;
  after tracking behavior of the user indicated by data received from user device associated with the user, receiving further audio of the user's voice as the user is speaking; and
  having, as the user is speaking, an oral conversation with the user based on the tracked behavior, the further audio of the user's voice, and goals learned from the user to help the user achieve the goals,
  wherein,
  the determining the response to the user speaking based on the determined mood is additionally based on the tracked behavior;
  the tracked behavior includes tracking location, online activity, electronic communications biometric sensor information, calendar items, clock items, or purchases of the user;
  the determining the response to the user speaking based on the determined mood includes;
    determining whether the user being in a sad mood is a change in mood that has occurred within a most recent threshold amount of time;
    determining whether, within the most recent threshold amount of time, there has been a change in the tracked behavior, determining that a correlation exists between the change in the tracked behavior and the change in mood, and determining the response to the user speaking based on the determining that the correlation exists between the change in the tracked behavior and the change in mood.

2. The method of claim 1 wherein the determining the mood of the user based on the detected tone of the user's voice includes:

electronically analyzing acoustic characteristics of the audio;

determining a particular mood that the acoustic characteristics are associated with; and determining the mood of the user is the particular mood.

3. The method of claim 1, in which the response is a synthesized voice communicated to the user via a speaker, and further comprising:

receiving, by the computerized interactive voice companion system, a voice response from the user to the question to the user inquiring why the user is sad; and having, by the computerized interactive voice companion system, an oral conversation in real-time with the user based on a response to the question to the user inquiring why the user is sad.

4. The method of claim 1 wherein the determining the response to the user speaking based on the determined mood of the user includes:

determining the response to be a one or more consoling statements to the user based on the tracked behavior of the user by the computerized interactive voice companion system and based on the determination that the user is in a sad mood.

5. The method of claim 1 wherein the determining the response to the user speaking based on the determined mood is additionally based on the tracked behavior.

6. The method of claim 1 wherein the change in the tracked behavior includes the user waking up late based on the clock items and the biometric sensor information and the determined response is to ask questions of the user regarding the user waking up late.

7. The method of claim 1 wherein the change in the tracked behavior includes the user purchasing over a threshold number of alcoholic drinks within a particular time window and the determined response is to ask questions of the user regarding excessive drinking.

8. The method of claim 5 wherein the tracked behavior includes tracking music preferences of the user via detecting which songs the user plays, the determined mood of the user is a sad mood, and the determining the response to the user speaking based on the determined mood includes playing a song based on the music preferences of the user to change the determined sad mood into a happy mood of the user.

9. A non-transitory computer-readable storage medium having computer-executable instructions stored thereon that, when executed by at least one processor, cause a computerized interactive voice companion system to perform:

receiving, by a computerized interactive voice companion system, audio of a user's voice as the user is speaking;

detecting, by the computerized interactive voice companion system, a tone of the user's voice based on the audio of the user's voice as the user is speaking;

determining, by the computerized interactive voice companion system, as the user is speaking, a response to the user speaking based on the detected tone of the user's voice, wherein the determined the response includes;

determining, by the computerized interactive voice companion system, a mood of the user based on the detected tone of the user's voice; and determining, by the computerized interactive voice companion system, the response to the user speaking based on the determined mood of the user, wherein the determining the response to the user speaking based on the determined mood of the user includes;

determining that the user is in a sad mood based on the detected tone of the user's voice; and determining the response to be a question to the user inquiring why the user is sad;

communicating, by the computerized interactive voice companion system, the response to the user automatically in real-time as a reply to the user speaking;

tracking behavior of the user indicated by data received from a user device associated with the user;

after tracking behavior of the user indicated by data received from the user device associated with the user, receiving further audio of the user's voice as the user is speaking; and having, as the user is speaking, an oral conversation with the user based on the tracked behavior, the further audio of the user's voice, and goals learned from the user to help the user achieve an the goals, wherein:

the determining the response to the user speaking based on the determined mood is additionally based on the tracked behavior;

the tracked behavior includes tracking location, online activity, electronic communications, biometric sensor information, calendar items, clock items, or purchases of the user;

the determining the response to the user speaking based on the determined mood includes;

determining whether the user being in a sad mood is a change in mood that has occurred within a most recent threshold amount of time;

determining whether, within the most recent threshold amount of time, there has been a change in the tracked behavior, determining that a correlation exists between the change in the tracked behavior and the change in mood; and determining the response to the user speaking based on the determining that the correlation exists between the change in the tracked behavior and the change in mood.

10. The non-transitory computer-readable storage medium of claim 9 in which having the conversation includes:

providing suggestions to the user on how to achieve the goals.

11. The non-transitory computer-readable storage medium of claim 9 in which having the conversation includes:

providing feedback to the user regarding the tracked behavior and suggestions on how to modify the tracked behavior to achieve the goals.

12. The non-transitory computer-readable storage medium of claim 9 in which having the conversation includes:

providing suggestions to the user regarding the tracked behavior and information received in audio of the user's voice.

13. An interactive voice companion system comprising:
at least one processor; and
at least one memory coupled to the at least one processor wherein the at least one memory has computer-executable instructions stored thereon that, when executed by at least one processor, cause the system to perform:
receiving audio of a user's voice as the user is speaking;
detecting a mood of the user based on the audio of the user's voice as the user is speaking;
determining, as the user is speaking, a response to the user speaking based on the detected mood of the user, wherein the determining the response to the user speaking based on the detected mood of the user includes:
determining that the user is in a sad mood based on the audio of the user's voice as the user is speaking; and
determining the response to be a question to the user inquiring why the user is sad;
communicating the response to the user automatically in real-time as a reply to the user speaking;
tracking behavior of the user indicated by data received from a user device associated with the user;
after tracking behavior of the user indicated by data received from the user device associated with the user, receiving further audio of the user's voice as the user is speaking; and
having, as the user is speaking, an oral conversation with the user based on the tracked behavior, the further audio of the user's voice, and goals learned from the user to help the user achieve the goals,
wherein,
the determining the response to the user speaking based on the determined mood is additionally based on the tracked behavior;
the tracked behavior includes tracking location, online activity, electronic communications, biometric sensor information, calendar items, clock items, or purchases of the user;
the determining the response to the user speaking based on the determined mood includes:
determining whether the user being in a sad mood is a change in mood that has occurred within a most recent threshold amount of time;
determining whether, within the most recent threshold amount of time, there has been a change in the tracked behavior;
determining that a correlation exists between the change in the tracked behavior and the change in mood; and
determining the response to the user speaking based on the determining that the correlation exists between the change in the tracked behavior and the change in mood.

14. The system of claim 13 wherein the computer-executable instructions, when executed by at least one processor, further cause the system to perform:
receiving a reply to the question; and
providing a response to the reply to the question to change the detected mood of the user.

15. The system of claim 13 wherein the determining the response to the user speaking based on the detected mood of the user includes:
tracking online website searches and website visits of the user based on data received from the user device associated with the user; and
determining the response to the user by including in the response preferences of the user based on the tracking online website searches and website visits of the user.

16. The system of claim 13 wherein the mood detected includes a mood score representing how happy or how sad the user is.

17. The system of claim 16 wherein the response to the user speaking is based on the mood score.

* * * * *